United States Patent
Wetz et al.

(10) Patent No.: US 7,108,755 B2
(45) Date of Patent: Sep. 19, 2006

(54) SIMPLIFICATION OF BALL ATTACH METHOD USING SUPER-SATURATED FINE CRYSTAL FLUX

(75) Inventors: Li Ann Wetz, Chandler, AZ (US); Lizabeth Ann Keser, Chandler, AZ (US); Rajiv Bajaj, Gilbert, AZ (US); Treliant Fang, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 63 days.

(21) Appl. No.: 10/208,330

(22) Filed: Jul. 30, 2002
(Under 37 CFR 1.47)

(65) Prior Publication Data
US 2004/0020562 A1 Feb. 5, 2004

(51) Int. Cl.
*B23K 1/20* (2006.01)
*B23K 35/363* (2006.01)
*C11D 7/26* (2006.01)

(52) U.S. Cl. ............... 148/23; 228/203; 228/207; 510/175

(58) Field of Classification Search ............ 148/23; 228/203, 207; 510/175
See application file for complete search history.

(56) References Cited

U.S. PATENT DOCUMENTS

| | | | | |
|---|---|---|---|---|
| 2,898,255 A | * | 8/1959 | Thompson et al. | ............ 148/23 |
| 4,092,182 A | | 5/1978 | Arbib et al. | |
| 4,218,248 A | * | 8/1980 | Snyder et al. | ............ 106/1.12 |
| 4,342,607 A | | 8/1982 | Zado | |
| 5,004,509 A | | 4/1991 | Bristol | |
| 5,009,724 A | | 4/1991 | Dodd et al. | |
| 5,011,711 A | | 4/1991 | Kanda et al. | |
| 5,150,832 A | | 9/1992 | Degani et al. | |
| 5,334,260 A | | 8/1994 | Stefanowski | |
| 5,417,771 A | | 5/1995 | Arita et al. | |
| 5,639,515 A | | 6/1997 | Kanda et al. | |
| 6,056,189 A | * | 5/2000 | Gao et al. | ............ 228/207 |
| 6,180,696 B1 | * | 1/2001 | Wong et al. | ............ 523/457 |
| 6,451,127 B1 | | 9/2002 | Li | |
| 2002/0195171 A1 | | 12/2002 | Li | |

OTHER PUBLICATIONS

Webster's II, New Riverside University Dictionary, published 1984, p. 1163.*

* cited by examiner

*Primary Examiner*—Ngoclan T. Mai
(74) *Attorney, Agent, or Firm*—John A. Fortkort; FortKort & Houston P.C.

(57) ABSTRACT

A method for preparing a metal surface (34) for a soldering operation is provided. In accordance with the method, the metal surface is treated with a solder flux (31) comprising a supersaturated solution of a carboxylic acid.

36 Claims, 2 Drawing Sheets

SIMPLIFICATION OF BALL ATTACH METHOD USING SUPER-SATURATED FINE CRYSTAL FLUX

FIELD OF THE INVENTION

The present invention relates generally to solder flux compositions, and more particularly to solder flux compositions useful for attaching a die to a substrate or motherboard.

BACKGROUND OF THE INVENTION

Various solder fluxes are used in conjunction with soldering materials in the soldering of electronic components, circuits, equipment and the like so as to improve the efficiency and quality of the soldering operation and to improve the long-term reliability of the connections. Solder fluxes are often designed to react with or dissolve metal oxides and impurities on the surfaces being soldered, and to coat the surface to protect it against oxidation.

The use of flux in soldering operations that involve items having very small features, as in ball attach operations on wafers for Wafer Level Chip Scale Packaging (WL-CSP), has placed great demands both on the flux itself and on its method of application. Because of their dimensions, devices of this type have very small tolerances for error in terms of the placement of a solder joint. Consequently, if the solder migrates from its original intended position on the substrate during reflow, electrical bridging can occur between neighboring solder joints, leading to a defective product.

One cause of solder migration is the flux itself. If the flux is not sufficiently aggressive, the solder can migrate across the surface of the flux during reflow, thus leading to the bridging problems noted above. In the past, this problem has been addressed through the selective application of solder flux to a surface through the use of a stencil or template. In theory, a stencil can minimize solder migration by limiting the area to which the solder flux is applied, hence limiting the area over which the solder can migrate.

FIGS. 1–3 illustrate the use of a stencil in applying a solder flux. In this approach, as shown in FIG. 1, a stencil 11 is applied to a wafer substrate 13. The stencil is equipped with a plurality of apertures 15 adapted to receive a solder flux. These apertures are spaced to direct the flux over the under bump metallization layer 14. The under bump metallization layer is in turn disposed on the bond pad 16. The solder flux 17 is then applied across the template using a squeegee 19. As shown in FIG. 2, after the solder flux 17 has been applied, the stencil 11 is removed, with the effect that the solder flux is applied only in the vicinity of the apertures. As shown in FIG. 3, the solder balls 21 are then positioned onto the solder flux 17 and are reflowed.

The stencil approach described above is undesirable in that the use of a stencil inherently complicates the manufacturing process. Also, any misalignment between the stencil and the substrate will result in the flux being improperly applied, thus resulting in product defects. Because of the dimensions involved, however, alignment is very difficult to control. Moreover, while the proper use of a stencil may be adequate in ensuring that solder flux is applied only to intended areas of a wafer substrate, this approach cannot ensure that the solder flux will not subsequently move from those areas during solder ball placement or reflow, thus compromising the benefits of using the stencil in the first place.

There is thus a need in the art for a solder flux, and for a method of applying a solder flux to a substrate, that can be used for ball attach operations on Wafer Level Chip Scale Packaging (WL-CSP) as well as in other solder ball attach applications, that does not require the use of a stencil for its application, and that minimizes solder migration. These and other needs are met by the compositions and methodologies described herein.

SUMMARY OF THE INVENTION

In one aspect, a method for preparing a metal surface for a soldering operation such as ball attach is disclosed herein. The method is particularly suitable for wafer level chip scale operations, where it may be used, for example, to treat an under bump metallization layer prior to ball attach. In accordance with the method, the metal surface is treated with a solder flux comprising a supersaturated solution of a carboxylic acid. Preferably, the solution comprises a mixture of carboxylic acids, and more preferably, the solution comprises a mixture of adipic acid, ortho-hydroxybenzoic acid, and para-hydroxybenzoic acid. The flux also preferably comprises a polyalkylene glycol such as polyethylene glycol, and more preferably comprises a mixture of a polyalkylene glycol such as polyethylene glycol with a polyalkylene glycol monoalkyl ether such as polypropylene glycol monobutyl ether. In many embodiments, the flux is sufficiently aggressive that it can be applied to a wafer substrate in a ball attach operation as a substantially uniform or continuous layer (that is, the layer extends across the bond pads and the spaces in between) without bridging occurring, thus avoiding the need for a stencil.

In another aspect, a method is disclosed herein for preparing an under bump metallization layer on a wafer for a ball attach operation, comprising the step of treating the under bump metallization layer with a solder flux comprising a supersaturated solution of at least one carboxylic acid disposed in a liquid medium comprising a polyalkylene glycol.

In still another aspect, a method is disclosed herein for preparing an under bump metallization layer for a ball attach operation, comprising the step of treating the under bump metallization layer with a solder flux comprising a mixture of organic acids disposed in a liquid medium comprising polyethylene glycol and a polypropylene glycol monoalkyl ether. The mixture of organic acids includes adipic acid, ortho-hydroxybenzoic acid and para-hydroxybenzoic acid.

In yet another aspect, a solder flux is disclosed herein which comprises a supersaturated solution of a carboxylic acid. Preferably, the solution comprises a mixture of carboxylic acids, and more preferably, the solution is a mixture of adipic acid, ortho-hydroxybenzoic acid, and para-hydroxybenzoic acid. The flux also preferably comprises a polyalkylene glycol such as polyethylene glycol, and more preferably comprises a mixture of a polyalkylene glycol such as polyethylene glycol with a polyalkylene glycol monoalkyl ether such as polypropylene glycol monobutyl ether.

In still another aspect, a method is disclosed herein for making a solder flux. In accordance with the method, a composition is provided which comprises a mixture of acids disposed in a liquid medium, wherein the liquid medium has a temperature $T_1$, wherein the mixture of acids comprises at least one acid selected from the group consisting of adipic acid, ortho-hydroxybenzoic acid and para-hydroxybenzoic acid, and wherein the amount of at least one of the acids in the composition exceeds the solubility of that acid in the liquid medium at $T_1$. The composition is then heated to a temperature $T_2$ at which all of the acids are completely dissolved in the liquid medium, after which the composition is cooled sufficiently to produce a solution that is supersaturated with respect to at least one of the acids. The liquid medium preferably comprises a polyethylene glycol and a polypropylene glycol, and the polypropylene glycol is preferably a polypropylene glycol ether, and more preferably a polypropylene glycol monoalkyl ether. The mixture of acids preferably comprises at least two acids selected from the group consisting of adipic acid, ortho-hydroxybenzoic acid and para-hydroxybenzoic acid, and more preferably comprises adipic acid, ortho-hydroxybenzoic acid and para-hydroxybenzoic acid.

These and other aspects of the present disclosure are described in greater detail below.

DETAILED DESCRIPTION

Figure 1:
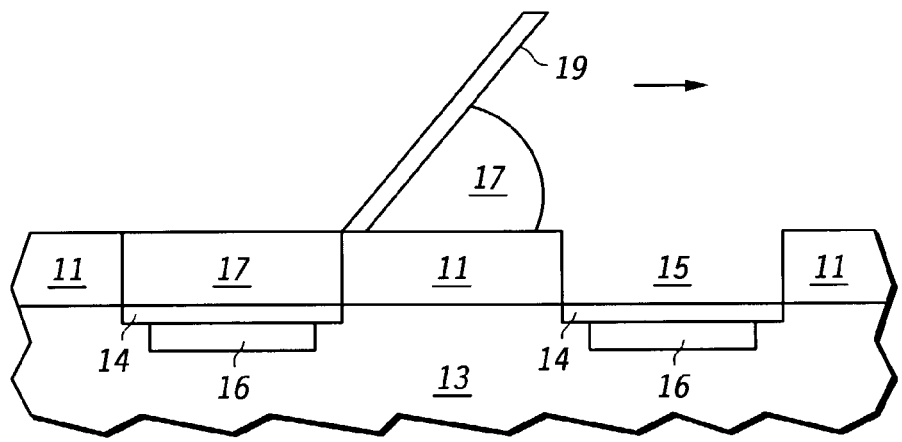
FIGS. 1–3 are illustrative drawings of a prior art method for applying a flux to a wafer substrate.
Figure 2:
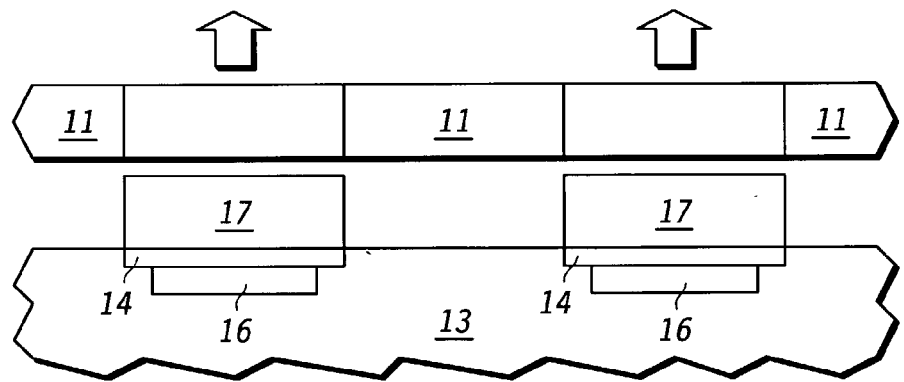
Figure 3:
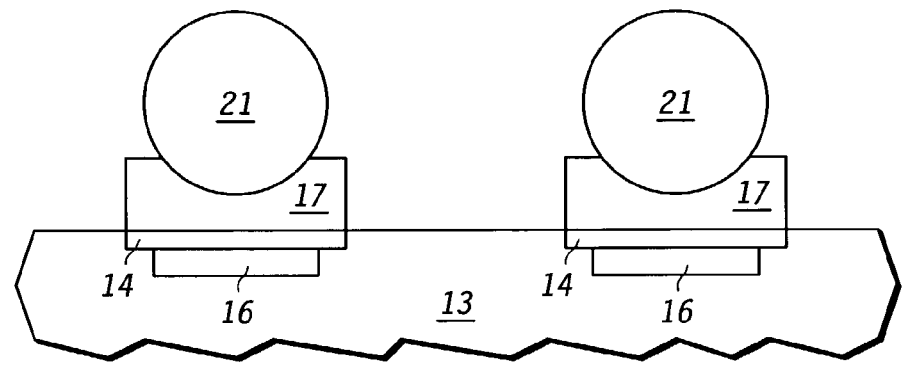

The present Applicants have now surprisingly discovered that very aggressive solder fluxes can be made from certain solutions of supersaturated carboxylic acids. Because these fluxes are so aggressive, they rapidly remove debris and oxide layers from metal surfaces to which they are applied, thereby presenting a clean metal surface that the solder adheres to very early in the reflow process. Consequently, solder migration during reflow is minimized. Moreover, since solder migration is minimized, the use of a stencil to apply the flux is no longer necessary. Rather, the flux may be applied as a continuous layer across the wafer or other such substrate. Accordingly, the use of the supersaturated solder fluxes described herein greatly simplifies and facilitates wafer level ball attach (as well as the application of solder in other forms), reduces the time and cost involved in this process, and eliminates a common source of product defects. Possible components of this flux are described in greater detail below.

A. Definitions

As used herein, the term "supersaturated" refers to a solution having a concentration of solute that is higher than the equilibrium solubility of the solute. The term "equilibrium solubility" refers to the concentration of the solute at which the rate at which solute dissolves and the rate at which the solute is deposited out of solution are the same.

B. Organic Acids

A variety of acids may be used in various embodiments of the solder fluxes described herein. The acids utilized are typically effective, either alone or in combination with other acids, at removing metal oxides or debris from the metal surface that the solder joint is to be adhered to, thereby yielding a clean, oxide-free surface for the solder joint. Depending on the specific application, the acid(s) may also be chosen to yield a solder flux that is sufficiently volatile so as to leave little or no residue after application or reflow, or to yield a water cleanable residue or a residue that is inert or harmless (e.g., non-corrosive) to the substrate or to components of the device to which they are applied.

The acids used in various embodiments of the solder fluxes described herein are preferably organic acids, and even more preferably carboxylic acids. Suitable carboxylic acids may be monocarboxylic acids, dicarboxylic acids, or polycarboxylic acids. Specific examples of such carboxylic acids include formic acid, acetic acid, propionic acid, abietic acid, valeric acid, caproic acid, phenylacetic acid, benzoic acid, aminobenzoic acid, succinic acid, glutaric acid, adipic acid, oxalic acid, malonic acid, pimelic acid, suberic acid, azelaic acid, sebacic acid, citric acid, tartaric acid, oleic acid, stearic acid, linoleic acid, mandelic acid, glyceric acid, glycolic acids, enanthic acid, capric acid, pelargonic acid, lauric acid, myristic acid, palmitic acid, arachic acid, behenic acid, acrylic acid, methacrylic acid, fumaric acid, maleic acid, levulinic acid, 12-hydroxystearic acid, benzoic acid, anisic acid, anthranilic acid, naphthalenecarboxylic acid, pimellic acid, dodecanedioic acid, eicosanedioic acid, phthalic acid, isophthalic acid, naphthalenedicarboxylic acid, diphenylsulfonedicarboxylic acid, diphenylmethanedicarboxylic acid, trimellitic acid, trimesic acid, pyromellitic acid, and butane-1,2,3,4-tetracarboxylic acid. Various fatty acids, some of which have already been noted above, may also be utilized in some embodiments of the fluxes described herein.

Various non-carboxylic acids may also be used in various embodiments of the solder fluxes described herein. For example, p-toluenesulfonic acid, 5-sulfosalicylic acid, 4-sulfophthalic acid, and sulfanilic acid may be useful in certain applications.

Various mixtures based on two or more of the foregoing acids may also be used in the fluxes described herein. Of these, mixtures of adipic acid, ortho-hydroxybenzoic acid (salicylic acid) and para-hydroxybenzoic acid are especially preferred. The most preferred mixtures are formed from approximately equal parts by weight of these three acids. With proper selection of the component acids and/or a liquid medium, a mixture may be achieved that has a boiling point which is lower than the boiling points of some or all of the mixture's components, thus facilitating removal of the flux during solder reflow.

If desired, the components of the mixture may also be selected to avoid sublimation, which can result in the condensation of acid on surface areas adjacent to the solder joint. Sublimation may also be avoided through other means such as, for example, through the use of a proper solvent medium or carrier.

Since the acids used in the fluxes described herein are preferably present in supersaturated solutions, these solutions may contain, at any given time, a certain amount of crystalline material that has deposited out of solution. If the flux is to be used in a ball attach operation, it is preferred that the deposition of the crystalline material is suitably controlled so that the average size of the largest dimension of these crystals is smaller than the solder bump pitch. Hence, it is preferred that crystal deposition is suitably controlled such that the average size of the largest dimension of these crystals is typically less than 100 microns, preferably less than about 50 microns, more preferably less than about 40 microns, and most preferably less than about 30 microns. Control of the crystal dimensions may be achieved through the selection of the flux components or their ratios, by controlling the cooling profile of the flux, through the addition of surfactants or other additives, through mechanical agitation of the flux while it is cooled, by filtering the cooled flux, or by other suitable means. Thus, for example, the supersaturated flux may be applied to the substrate across a porous membrane that filters out any particles from the flux that exceed a given diameter.

C. Solvents and Liquid Media

A variety of solvent systems and liquid media may be employed in the solder fluxes described herein. In some embodiments, a single material may be used as the solvent or liquid medium for the flux. In other embodiments, mixtures of materials may be employed as the solvent or liquid medium for the flux. In still other embodiments, the solvent system or liquid medium may include a carrier such as polyethylene glycol which prevents the acids in the flux from volatilizing, and a main component, such as polypropylene glycol monobutyl ether, which may act as a general solvent for the flux and/or carrier. The general solvent is preferably capable of dissolving both the active ingredients of the flux and the carrier, it being understood that the general solvent may not dissolve all of the active flux components completely (one example of such incomplete solvation would include a supersaturated solution). In some embodiments, the solvent system or liquid medium may also include low boiling components that may be driven off early in a soldering or solder reflow process, and high boiling components that may be retained in the flux until later in a soldering or solder reflow process.

Useful components of the solvent systems and liquid media employed in the fluxes described herein may include, for example, alcohols such as, for example, methanol, ethanol, isopropyl alcohol, n-propyl alcohol, n-butyl alcohol, sec-butyl alcohol, or higher boiling aliphatic or cycloaliphatic alcohols, such as, for example, tetrahydrofurfuryl alcohol. Suitable alcohols may also include other volatilizable aliphatic or cycloaliphatic alcohols, especially those in which the flux components are at least partially soluble.

Polyols (including glycols), including those with ester or ether linkages, are especially useful in the solvent systems and liquid media used in the fluxes described herein, and may, in some embodiments, serve as the carrier and/or the general solvent. Such polyols may include branched or straight chain alkylene polyols, such as, for example, ethylene, propylene, butylene, hexylene, isopropylene, isobutylene, and isopentylene polyols and polyvinyl alcohol. They may also include polyol esters, polyol ethers, and polyol ether esters, including, for example, diethylene glycol butyl ether acetate, tripropylene glycol methyl ether acetate, ethylene glycol phenyl ether acetate, polyvinylisobutyl ether, and diethylene glycol ethyl ether acetate.

Aliphatic dibasic esters may also be used in the solvent systems and liquid media employed in the fluxes described herein. Suitable aliphatic dibasic esters include, for example, dimethyl adipate, dimethyl glutarate, dimethyl succinate, and combinations thereof.

Polyvinylalkylethers may also be used in the solvent systems and liquid media employed in the fluxes described herein. Of these, those in which the alkyl group contains from 1–5 carbon atoms, such as polyvinylisobutylether, are especially preferred.

The solvent systems and liquid media employed in the solder fluxes described herein may also include aliphatic carboxylic acid esters having low boiling points, including, for example, succinic acid dimethyl ester, or mixtures of succinic, glutaric and adipic acid dialkyl ester.

The solvent systems and liquid media employed in the solder fluxes described herein may also include aliphatic, cyclic or cycloaliphatic ketones, including azacycloaliphatic (i.e., N-heterocyclic) ketones, cyclopentanone, cyclohexanone, N-methyl-2-pyrrolidone, acetone, and methyl ethyl ketone.

Additionally, the solvent systems and liquid media employed in the solder fluxes described herein may also include aromatic or aliphatic hydrocarbons. The addition of a hydrocarbon may, in some cases, improve the electrical properties of the substrate and enhance the ease of removal of the flux from the device with non-polar solvents such as trichloroethane and perchloroethylene, if the use of such solvents is desired. Possible hydrocarbons include dixylyl ethane (1,1-di(orthoxylyl) ethane), natural oils such as squalane or squalene, mineral oil, and aromatic hydrocarbons such as, for example, toluene and xylene.

Of the various possible components described above, the solvent system or liquid medium used in the fluxes described herein is preferably based on a mixture of polyethylene glycol with a polyalkylene glycol ether such as a polypropylene glycol ether. The polyethylene glycol typically has an average molecular weight within the range of about 200 g/mol to about 4000 g/mol, preferably within the range of about 700 g/mol to about 1200 g/mol, and more preferably within the range of about 700 g/mol to about 1000 g/mol. Most preferably, the polyethylene glycol has an average molecular weight of about 900 g/mol. The polypropylene glycol ether is preferably a polypropylene glycol monoalkyl ether, and is most preferably polypropylene glycol monobutyl ether.

In the solder fluxes described herein which utilize a solvent system or liquid medium based on a mixture of polyethylene glycol with a polypropylene glycol ether, the amount of polyethylene glycol will typically range from about 5% to about 50%, preferably from about 10% to about 30%, and more preferably from about 15% to about 25%, based on the total weight of the flux. Most preferably, the amount of polyethylene glycol in the mixture will be about 17% by weight, based on the total weight of the flux. The amount of polypropylene glycol ether will typically range from about 10% to about 80%, preferably from about 20% to about 60%, and more preferably from about 35% to about 50%, based on the total weight of the flux. Most preferably, the amount of polypropylene glycol ether in the mixture will be about 44% by weight, based on the total weight of the flux.

D. Surfactants

In some embodiments of the solder flux compositions disclosed herein, it may be advantageous to include one or more surfactants in the composition. Such surfactants, which are preferably nonionic, include phenoxypolyethoxy ethanols; perfluoralkyl alcohols; glycol fatty acid esters such as glycerol monolaurate and ethylene glycol distearate; alkylaryl polyether alcohols; tertiary acetylenic glycols; ethoxylated polyoxypropylenes; alkoxylated phenols, such as alkoxylated bisphenols; mono-, di- or tri-alkyl or -aryl phosphate esters; keto fatty acids or ketone acids, such as levulinic acid; polycarboxylic acids; and mixtures of the foregoing.

E. Anticorrosion Agents and Complexing Agents

In some embodiments of the flux compositions disclosed herein, it may be advantageous to include one or more anticorrosion agents to prevent/minimize oxidation of the metals being soldered. Examples of possible anticorrosion agents include benzimidazole, benzotriazole and imidazole.

It may also be advantageous in some embodiments to employ a complexing agent, such as, for example, ethylamine or other simple amines, or a chelating agent, such as, for example, ethylene diamine tetra-acetic acid.

F. Rheology Promotors

The flux compositions described herein may also include one or more rheological property promoters for achieving a desired tackiness, viscosity or printability as may be needed for certain applications of the solder flux. These may include such materials as polyvinyl pyrolidone, starch, hydroxy ethyl cellulose gums such as arabic gum, tragacanth gum and xantan gum, polyacrylic acid, polyacryl amide, ethyl cellulose, poly (ethylene-acrylic acid), and poly butene.

G. Methods of Applying Flux and Solder

The flux compositions described herein may be applied to a metal surface by a variety of techniques, including foaming, wave fluxing, spraying, brushing, rolling, dipping and screen printing (as noted above, this latter method is typically not necessary, but may still be employed if desired). The solder may also be applied to the flux-coated surfaces through a variety of techniques, including drop dispensing and wave soldering.

H. EXAMPLES

In the following examples, unless indicated otherwise, all percentages of the flux components refer to the percent by weight of the component, based on the total weight of the flux.

Example 1

This example illustrates the preparation of a supersaturated flux in accordance with the teachings herein.

Equal parts of adipic acid (melting point: 153° C.; boiling point: 265° C.), salicylic acid (ortho-hydroxybenzoic acid) (melting point: 160° C.; boiling point: 211° C.) and para-hydroxybenzoic acid (melting point: 216° C.) were mixed together. Next, polyethylene glycol (having an average molecular weight of 900 g/mol) and polypropylene glycol monobutyl ether were added to the acid mixture, and the resulting solution was heated to 180° C. with slow stirring. The solution was removed from heat once it became clear. The stirring speed was slowly increased to a high speed to avoid foaming.

Upon cooling, a homogeneous crystalline phase precipitated from the blend. When the solution cooled to about 50° C., the crystals were measured and found to have an average maximum diameter of less than about 50 microns. The crystals were observed to continue to grow for several hours after the solution was cooled to room temperature, thus demonstrating that the solution remains supersaturated for some time after it is cooled.

Examples 2–3

The following examples illustrate the use of a solder flux made in accordance with the teachings herein.

The efficacy of the supersaturated solder flux of EXAMPLE 1 was tested by utilizing the flux, while it was still in a supersaturated form, in a WL-CSP ball attach operation. Two separate wafers were involved in the experiment, each die on each wafer having an 8×8 I/O array and thus requiring the application of 64 solder bumps, each bump having a pitch of about 0.5 mm. Each die was square with a side 5 mm in length.

In each case, the flux was squeegee printed onto the surface of the wafer using a screen printer. In EXAMPLE 2, a 2-mil thick layer of the aforementioned flux was deposited onto the surface of the wafer prior to solder application. In EXAMPLE 3, a 3-mil thick layer of the aforementioned flux was deposited onto the surface of the wafer prior to solder application.

Figure 4:
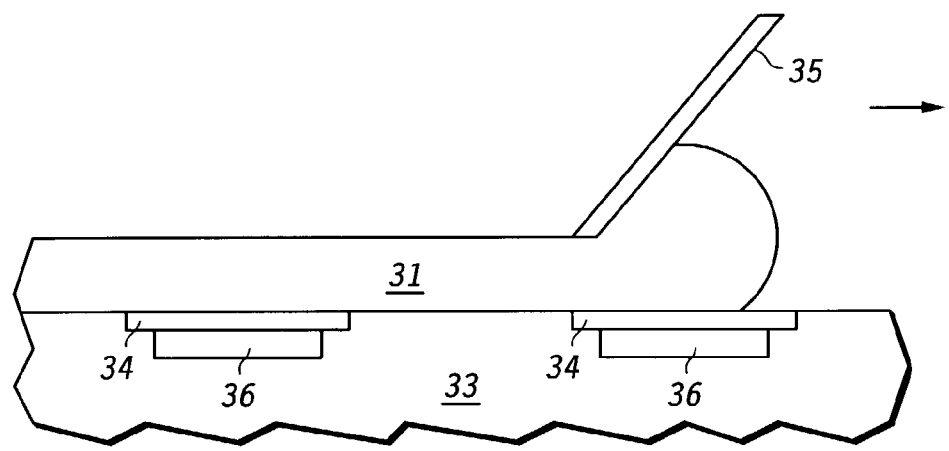
FIGS. 4–5 are illustrative drawings of a method in accordance with the teachings herein for applying a flux to a wafer substrate.
Figure 5:
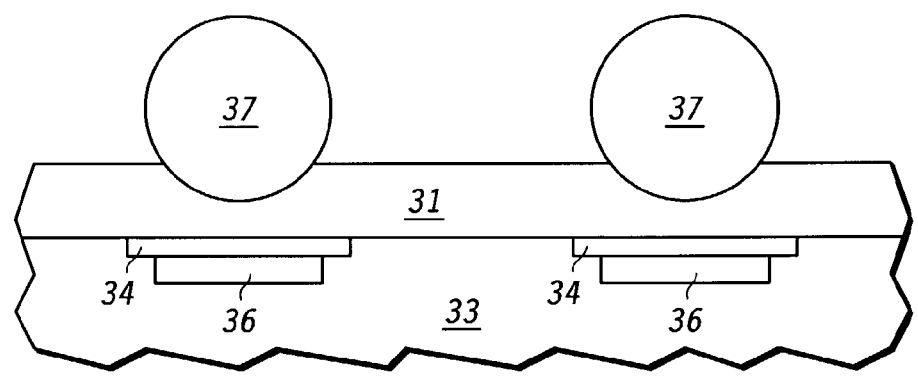

The method used to apply the flux is illustrated in FIGS. 4–5, and did not involve the use of a template or stencil. In accordance with the method, the flux 31 was applied to a wafer substrate 33 using a squeegee 35. The wafer contained a plurality of bond pads 36, each of which was fitted with an under bump metallization layer 34. The flux was applied as a relatively even coating over the entire surface of the wafer. The solder balls 37, which had the composition $Sn_{62}Pb_{36}Ag_2$, were then placed on top of the flux using a manual ball drop tool. This tool is basically a screen with a pattern of holes in it through which the solder balls are dropped onto the surface of the wafer.

After solder ball deposition, the solder balls were reflowed at a temperature within the range of about 220 to about 250° C., and the number of defective dice were counted. For the purposes of these examples, a die having at least one defective solder bump after reflow was recorded as a reject, regardless of the number of defective bumps present on the die. Hence, only dice having 64 acceptable solder bumps were recorded as being non-defective.

In EXAMPLE 2, the die yield was found to be 83%, while in EXAMPLE 3, the die yield was found to be 72%. These yields are quite good, considering that no attempt was made to optimize the results and that the methodologies and equipment utilized were much cruder and more prone to error than the methodologies and equipment that would be used in a commercial ball attach operation. In particular, most of the defects present in the rejected die were of a type attributable to operator error, such as errors in the application of the flux or errors in the placement of the solder balls; such errors would typically not occur in an automated, commercial scale process.

Comparative Example 1

EXAMPLE 2 was repeated, except that this time a commercially available flux (TAC 014, available commercially from Indium Corporation) was used in place of the flux of EXAMPLE 1. Upon reflow, serious bridging problems ensued, and the resulting die yield was 0%.

EXAMPLES 2–3 and COMPARATIVE EXAMPLE 1 illustrate the effectiveness of the supersaturated flux compositions described herein in a ball attach operation of the type involved in the manufacture of WL-CSP devices, even when no stencil is used. These examples also demonstrate the superiority of these fluxes over existing fluxes. As noted above, no attempt was made to optimize these results or the various process parameters involved (e.g., print speed and squeegee pressure), and the equipment used as described above, while suitable for small scale experimentation, is much less sophisticated than the equipment typically used in large scale ball attach operations (this later equipment would typically include an automated system with automatic alignment, an automatic (and optimized) flux printer, and a no-contact ball placement). Even so, however, the results demonstrate the superiority of the solder fluxes described herein over commercially available fluxes. Moreover, since most of the defects observed in the products of EXAMPLES 2–3 were of a type attributable to operator error, it would be expected that the fluxes described in those examples could be used in a more sophisticated process (e.g., a process having better ball placement and less flux smearing) to give a die yield close to 100%.

A solder flux, and a method of applying a solder flux to a substrate, has been provided herein that can be used for ball attach in Wafer Level Chip Scale Packaging (WL-CSP) operations and in other soldering operations, that does not require the use of a stencil for its application, and that minimizes solder migration.

The above description of the present invention is illustrative, and is not intended to be limiting. It will thus be appreciated that various additions, substitutions and modifications may be made to the above described embodiments without departing from the scope of the present invention. Accordingly, the scope of the present invention should be construed in reference to the appended claims.

What is claimed is:

1. A method for preparing a metal surface for a soldering operation, comprising:
   providing a metal surface; and
   treating the metal surface with a solder flux comprising
   (a) a supersaturated solution of a carboxylic acid, and
   (b) a polyalkylene glycol.

2. The method of claim 1, wherein said carboxylic acid is adipic acid.

3. The method of claim 1, wherein said carboxylic acid is a hydroxybenzoic acid.

4. The method of claim 1, wherein the solder flux comprises a mixture of carboxylic acids comprising adipic acid, ortho-hydroxybenzoic acid, and para-hydroxybenzoic acid.

5. The method of claim 1, wherein the solder flux further comprises a polyalkylene glycol monoalkyl ether.

6. The method of claim 5, wherein the polyalkylene glycol is polyethylene glycol, and wherein the polyalkylene glycol monoalkyl ether is polypropylene glycol monobutyl ether.

7. The method of claim 1, wherein the carboxylic acid is at least partially crystallized, and wherein the crystals of the carboxylic acid present in the flux have a crystal size of less than about 50 microns in diameter.

8. A method& for preparing an under bump metallization layer on a wafer for a ball attach operation, comprising the step of:
   treating the under bump metallization layer with a solder flux comprising a supersaturated solution of a carboxylic acid disposed in a liquid medium comprising a polyalkylene glycol.

9. The method of claim 8, wherein the solution comprises a mixture of carboxylic acids, and wherein at least one acid in the mixture is selected from the group consisting of adipic acid, ortho-hydroxybenzoic acid, and para-hydroxybenzoic acid.

10. The method of claim 8, wherein the step of treating the under bump metallization layer includes the step of applying the solder flux as an essentially continuous coating over the surface of the wafer.

11. A method for preparing an under bump metallization layer for a ball attach operation, comprising the step of treating the under bump metallization layer with a solder flux comprising adipic acid, ortho-hydroxybenzoic acid and para-hydroxybenzoic acid disposed in a liquid medium comprising polyethylene glycol and a polypropylene glycol monoalkyl ether.

12. The method of claim 11, wherein the polypropylene glycol monoalkyl ether is polypropylene glycol monobutyl ether.

13. The method of claim 11, wherein the solder flux is supersaturated.

14. A solder flux, comprising a selected from the group consisting of adipic acid, acetic acid, propionic acid, abietic acid, valeric acid, caproic acid, phenylacetic acid, benzoic acid, aminobenzoic acid, glyceric acid, mandelic acid, glycolic acid, enanthic acid, acrylic acid, methacrylic acid, levulinic acid, hydroxybenzoic acids and fatty acids.

15. The solder flux of claim 14, wherein said carboxylic acid is adipic acid.

16. The solder flux of claim 14, wherein said carboxylic acid is a hydroxybenzoic acid.

17. The solder flux of claim 14, wherein the solder flux comprises a mixture of adipic acid, ortho-hydroxybenzoic acid, and para-hydroxybenzoic acid.

18. The solder flux of claim 14, wherein the solder flux comprises a polyalkylene glycol.

19. The solder flux of claim 18, wherein the solder flux further comprises a polyalkylene glycol monoalkyl ether.

20. The solder flux of claim 19, wherein the polyalkylene glycol is polyethylene glycol, and wherein the polyalkylene glycol monoalkyl ether is a polypropylene glycol monoalkyl ether.

21. The solder flux of claim 14, wherein said carboxylic acid is at least partially crystallized, and wherein the crystals of said carboxylic acid have a crystal size of less than about 50 microns in diameter.

22. A method for making a solder flux, comprising:
   providing a composition comprising a mixture of acids disposed in a liquid medium, wherein the liquid medium has a temperature $T_1$, wherein the mixture of acids comprises at least one acid selected from the group consisting of adipic acid, ortho-hydroxybenzoic acid and para-hydroxybenzoic acid, and wherein the amount of at least one of the acids in the composition exceeds the solubility of that acid in the liquid medium at $T_1$;
   heating the composition to a temperature $T_2$ at which all of the acids are completely dissolved in the liquid medium; and
   cooling the composition sufficiently to produce a solution that is supersaturated with respect to at least one of the acids.

23. The method of claim 22, wherein the liquid medium comprises a polyethylene glycol arid a polypropylene glycol.

24. The method of claim 23, wherein the polypropylene glycol is a polypropylene glycol ether.

25. The method of claim 24, wherein the polypropylene glycol is a polypropylene glycol monoalkyl ether.

26. The method of claim 22, wherein the mixture of acids comprises at least two acids selected from the group consisting of adipic acid, ortho-hydroxybenzoic acid and para-hydroxybenzoic acid.

27. The method of claim 22, wherein the mixture of acids comprises adipic acid, ortho-hydroxybenzoic acid and para-hydroxybenzoic acid.

28. A method for preparing a wafer for a ball attach operation, comprising the steps of:
   providing a wafer having a first surface with a plurality of bond pads disposed thereon, each of said plurality of bond pads having an under bump metallization layer disposed thereon; and
   disposing a continuous layer of solder flux over the first surface of the wafer, the solder flux comprising a supersaturated solution comprising a carboxylic acid and a polyalkylene glycol.

29. A method for making a solder flux, comprising the steps of:

creating a supersaturated solution comprising a mixture of acids disposed in a liquid medium, wherein the mixture comprises at least one acid selected from the group consisting of adipic acid, ortho-hydroxybenzoic acid and para-hydroxybenzoic acid.

30. The method of claim 29, wherein the supersaturated solution is created by the steps of:

adding each of the acids in the mixture to the liquid medium;

heating the liquid medium to a temperature $T_1$ at which all of the acids are completely dissolved in the liquid medium; and cooling the composition to a temperature $T_2$ at which the liquid medium is supersaturated with respect to at least one of the acids.

31. The method of claim 30, wherein the supersaturated solution is created by the steps of:

heating the liquid medium to a temperature $T_1$ at which all of the acids are completely dissolved in the liquid medium, thereby obtaining a heated liquid medium;

adding each of the acids in the mixture to the heated liquid medium; and cooling the composition to a temperature $T_2$ at which the liquid medium is supersaturated with respect to at least one of the acids.

32. The method of claim 1, wherein the supersaturated solution comprising the polyalkylene glycol and is created by the steps of:

heating the solution to a temperature $T_1$ at which the carboxylic acid is completely dissolved in the polyalkylene glycol; and cooling the solution to a temperature $T_2$ at which the polyalkylene glycol is supersaturated with respect to the carboxylic acid.

33. The method of claim 32, wherein $T_2$ is room temperature.

34. The method of claim 8, wherein the supersaturated solution further comprises a liquid medium and is created by the steps of:

heating the solution to a temperature $T_1$ at which the carboxylic acid is completely dissolved in the liquid medium; and cooling the solution to a temperature $T_2$ at which the liquid medium is supersaturated with respect to the carboxylic acid.

35. The method of claim 34, wherein $T_2$ is room temperature.

36. The method of claim 1, wherein the supersaturated solution is created by the steps of:

adding the carboxylic acid to a polyalkylene glycol;

heating the polyalkylene glycol to a temperature $T_1$ at which is completely dissolved in the polyalkylene glycol; and cooling the polyalkylene glycol to a temperature $T_2$ at which the polyalkylene glycol is supersaturated with respect to the carboxylic acid, thereby forming a supersaturated solution; wherein the supersaturated solution is cooled for more than an hour before it is used to treat the metal surface.

* * * * *

UNITED STATES PATENT AND TRADEMARK OFFICE
CERTIFICATE OF CORRECTION

| | | |
|---|---|---|
| PATENT NO. | : 7,108,755 B2 | Page 1 of 1 |
| APPLICATION NO. | : 10/208330 | |
| DATED | : September 19, 2006 | |
| INVENTOR(S) | : Li Ann Wetz et al. | |

It is certified that error appears in the above-identified patent and that said Letters Patent is hereby corrected as shown below:

IN THE CLAIMS

Column 9, line 40, delete "method&" and insert therefor -- method --.

Column 10, line 45, delete "arid" and insert therefor -- and -- .

Column 10, line 1, after "a" insert -- supersaturated solution of a carboxylic acid -- .

Signed and Sealed this

Twelfth Day of June, 2007

JON W. DUDAS
*Director of the United States Patent and Trademark Office*